United States Patent [19]

Kempf

[11] Patent Number: 4,840,455
[45] Date of Patent: Jun. 20, 1989

[54] 3-DIMENSIONAL OPTICAL VIEWING SYSTEM

[75] Inventor: Paul S. Kempf, Solana Beach, Calif.

[73] Assignee: Paul Stuart Kempf and Pilar Moreno Family Trust, Encinitas, Calif.

[21] Appl. No.: 714,102

[22] Filed: Mar. 20, 1985

[51] Int. Cl.$^4$ .............................................. G02B 27/22
[52] U.S. Cl. ............................................................ 350/137
[58] Field of Search ............... 350/130, 131, 137, 133

[56] References Cited

U.S. PATENT DOCUMENTS

| | | | |
|---|---|---|---|
| 1,987,443 | 1/1935 | Ives | 353/7 |
| 2,045,120 | 6/1936 | Carpenter | 353/7 |
| 2,169,397 | 8/1939 | Stanley | 350/144 |
| 2,391,675 | 12/1945 | Brown | 350/137 |
| 2,570,654 | 10/1951 | Dodin | 353/99 |
| 3,274,884 | 9/1966 | Sortor | 350/138 |
| 3,447,854 | 6/1969 | Minter | 350/131 |
| 3,572,893 | 3/1971 | Bennett et al. | 350/130 |
| 3,744,917 | 7/1973 | Craig | 356/168 |
| 3,785,715 | 1/1974 | Mecklenborg | 350/55 |
| 4,017,147 | 4/1977 | Weber et al. | 350/30 |
| 4,232,968 | 11/1980 | Kempf | 356/393 |
| 4,235,515 | 11/1980 | Sheiman et al. | 350/138 |
| 4,322,743 | 3/1982 | Rickert | 358/88 |
| 4,623,223 | 11/1986 | Kempf | 350/137 X |

FOREIGN PATENT DOCUMENTS 432385  3/1948  Italy ................................. 350/137

OTHER PUBLICATIONS

Masters, C. T.; "Generating a 3-D T-D Signal with One TV Camera"; *IBM Tech. Disc. Bulletin;* vol. 8, No. 1; Jun. 1965.

*Primary Examiner*—John K. Corbin
*Assistant Examiner*—Scott J. Sugarman
*Attorney, Agent, or Firm*—Brown, Martin, Haller & McClain

[57] ABSTRACT

An optical viewing system for producing a 3-dimensional effect is arranged to project two different and separated views of an object simultaneously along different optical paths onto opposite halves of a retina of a viewer's eye, or onto both eyes of a viewer. The system includes a projecting lens, an image separator for projecting two separate images of the object, and a reflector for reflecting the images separately through at least one eye opening or exit pupil into a viewer's eye.

11 Claims, 3 Drawing Sheets

3-DIMENSIONAL OPTICAL VIEWING SYSTEM

BACKGROUND OF THE INVENTION

The present invention relates to a system for 3-dimensional viewing of objects such as printed circuit boards, hybrid microelectronics assemblies, eye implant lenses, medical devices, and the like, where close inspection is necessary to pinpoint any irregularities or defects which may be on a relatively small scale.

In order for small defects or irregularities on such objects to be seen and understood, the object must normally be magnified. It is also desirable to see a 3-dimensional view of the object so that the depth of any edges in the object can be understood, and also so that the observer can see around edges and observe defects or features of the object which would otherwise be hidden or unclear in a 2-dimensional view.

Existing devices for viewing such objects include magnifying lenses and screen projectors. Magnifying lenses are limited in magnifying power and field of view, and are tiring to use. Screen projectors produce a flat 2-dimensional image of limited resolution.

The 3-dimensional effect in normal vision is produced by two slightly different retinal images being produced by each eye, with the brain combining these images to produce an impression of depth. This is known as the "stereoscopic" effect.

This effect has been imitated to a certain extent in optical devices such as stereoscopes and stereomicroscopes, so that the observer gets some impression of depth. In stereoscopes two photographs of an object are taken from different angles, and viewing lenses are used to direct images of the photographs to the eyes separately, so that one eye views only one of the photographs and the other eye views the other photograph. In a stereomicroscope two microscope systems are employed, one for each eye, so that each eye sees a slightly different view of the same object. This produces a stereoscopic effect but has limited field of view and depth of focus. Also since the eyes must be precisely positioned a very steady head position is required, and precise interpupillary distance adjustments must be made. Because microscopes involve a refractive lens system, the edges of wires and other sharp objects viewed tend to break down into "color fringes", producing fuzzy edges lacking good resolution. At high magnifications the stereoscopic effect is hard to control and may produce images which are flat and lack depth. Also, since the eyes must be stationary and precisely positioned, the object must be moved in order to see around edges.

Thus optical devices for producing a stereoscopic effect have conventionally involved using both eyes to superimpose two different images of the object. However, in U.S. Pat. No. 4,232,968, issued to the applicant in the present application, an optical comparator is described which produces a 3-D effect when the image is viewed by a single eye. In the optical comparator described in U.S. Pat. No. 4,232,968, images of two objects are projected in separate optical paths and are greatly enlarged. The resultant image shows the two objects side by side with a sharp dividing line. The exit pupil is substantially larger than the eye pupil of a viewer, and movement of the eye from side to side gives views of the object from different angles. This is apparently the source of the 3-D effect of this device.

SUMMARY OF THE INVENTION

It is an object of the present invention to provide an optical inspection system for viewing objects in which an enhanced 3-D effect is produced.

The optical inspection device of this invention is designed to present two different and separated views of one object simultaneously, either at a single eye opening or exit pupil where they will be combined in one eye as a 3-D picture, or at two eye openings or exit pupils so that one of the images is seen by the left eye and the other is seen by the right eye and the two images are combined as a 3-D image by the brain.

The system includes a projector-image separator for projecting two separate images of the object from different angles. In the preferred embodiment of the invention this comprises an image projecting lens and two mirrors arranged to shutter the lens into two halves and to direct separate images of the object from different angles into the exit pupil or an eye positioned at the exit pupil. In one example of the invention the mirrors are contiguous so that they form a so-called "corner mirror". They may be positioned after the lens in the optical path so that their dividing line splits the image projected from the lens, with each mirror reflecting a separate image of the object from the different halves of the lens along separate optical paths through the system. Alternatively, they may be positioned between the object and the lens so as to reflect two separate images of the object onto the lens.

In the preferred embodiment of the invention a single eye opening or exit pupil is provided and a concave mirror is used to reflect the separates images to the exit pupil, where they are combined by the observer's eye to produce a 3-D effect. The concave mirror is suitably a spherical mirror or spherical mirror with aspheric correction, with the exit pupil located at the radius of the mirror and a beamsplitter is inclined across the optical paths of the images to reflect the images to the exit pupil. Alternatively, the beamsplitter may be omitted with the exit pupil suitably positioned to receive both images from the spherical mirror.

In this system two different and separated views of the object are presented simultaneously to the eye of a viewer (or both eyes where there are two eye openings).

Some advantages of this invention are the production of excellent resolution in a 3-D image and improved depth of focus and field of view.

Another advantage of this invention is the production of an enhanced 3-D effect at relatively high magnifications, with little flattening out of the image.

BRIEF DESCRIPTION OF THE DRAWINGS

The above and other objects and advantages will be apparent in the following description of some preferred embodiments of the invention, taken in conjunction with the accompanying drawings, in which.

DESCRIPTION OF THE PREFERRED EMBODIMENT

Figure 2:
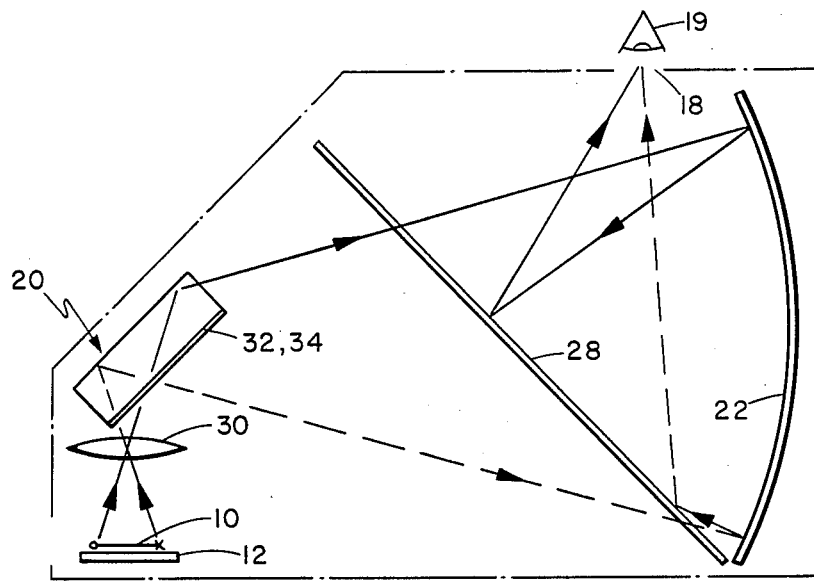
FIG. 2 is a right side elevational view of the system shown in FIG. 1.
Figure 1:
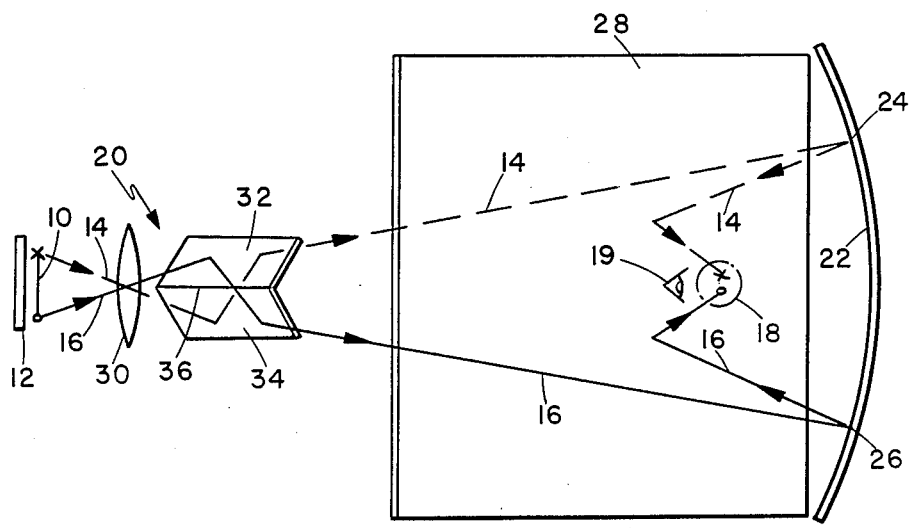
FIG. 1 is a top plan view showing the principal optical components of a system according to a first embodiment of the present invention, with the image projecting elements flattened out for clarity.

FIGS. 1 and 2 of the drawings illustrate a first embodiment of an optical viewing system according to the invention for producing a 3-dimensional effect. The system will be contained in a suitable housing (shown in dotted outline in FIG. 2) for shielding the system from stray light, and the various components of the system will be mounted in the housing by means of suitable supporting structures. However, for reasons of clarity only the optical components of the system are illustrated in the drawings of this embodiment, and in the embodiments illustrated in FIGS. 3 and 4.

An object 10 to be viewed is positioned in a suitable holder 12 provided in the housing in the optical path of the system. The holder may be either fixed or movable manually for scanning across larger objects.

The optical system is arranged to project two separate images of the object 10 along separate paths 14, 16 which are prevented from co-mingling in the system, and to reflect these images into an eye opening or exit pupil 18. An eye 19 positioned at the exit pupil will receive the images separately on opposite halves of the retina, and the two sets of information will be registered by the brain and interpreted as a 3-dimensional picture, as discussed in more detail below.

The optical system basically comprises an image projecting assembly 20 for projecting two separate images of the object 10 from slightly different angles along the separate paths 14 and 16, and a concave reflecting mirror 22 on which the separate images are focussed at separate locations 24 and 26. The images are reflected from the concave mirror onto a beamsplitter 28 which reflects them into the exit pupil 18.

The image projecting assembly 20 comprises a lens 30 mounted above the object, and a pair of contiguous planar mirror 32, 34 meeting along a single edge 36 to form a corner mirror. The mirrors 32 and 34 are arranged to reflect two separate images of the object along the paths 14 and 16 from opposite halves of the lens 30. The mirrors are positioned so that they do not coincide with a focal plane of the lens and so that their dividing line 36 splits the image from the lens. Each mirror acts as a shutter for one half of the lens. Thus one mirror 32 is directed at one half of the lens so as to project the image from that half of the lens only, and the other mirror 34 is directed at the opposite half of the lens so as to project the image from that half only. The mirrors 32 and 34 meet at a 90 degree angle. In FIG. 1 the elements of the image projecting assembly are extended in a flattened out position to facilitate the illustration of the individual optical paths. The lens and object would actually be below the pair of mirrors.

Figure 3:
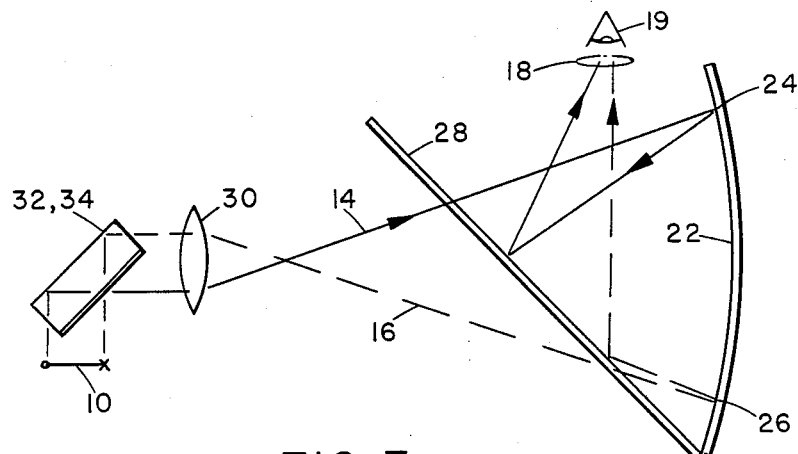
FIG. 3 is a side elevational view showing a modification to the system of FIG. 1 and 2.

The same effect could be achieved as shown in FIG. 3 by having the corner mirror 32, 34 on the object side of the lens reflecting two separate images from two angles onto the opposite halves of the lens. The corner mirror views the object (or the image of the object from the lens) from two different angles, with the two mirrors "seeing" the same view of the object only at their line of contact 36. The system shown in FIG. 3 is otherwise the same as that of FIG. 2, and equivalent reference numerals have been used.

The mirrors 32, 34 in both FIG. 2 and FIG. 3 are preferably positioned as close to the lens as possible to give the best possible separation of the two images.

The separate images then pass through the beamsplitter 28 and are focused at the separate locations 24, 26 on the surface of the concave mirror 22. The concave mirror is preferably substantially spherical.

The images are reflected from the concave mirror 22 onto the beamsplitter 28, which reflects both images separately into the exit pupil 18 for viewing by a single eye. The exit pupil 18 is located at a radius of the spherical mirror 22, as seen in FIG. 2, so that the images received at the exit pupil and eye 19 are in focus. Since two different views of the object from slightly different angles are simultaneously and separately directed into the exit pupil 18 and viewer's eye 19, the eye will "see" a 3-dimensional effect.

This may be understood more easily if the theory of normal two eye stereoscopic vision is considered. In this case the right and left eyes see a different view of a 3-dimensional object, from slightly different angles, and these views are combined in the brain to produce a 3-D picture. In fact the retina of each eye is roughly divided in half with each half having nerve fibers going to both halves of the brain. However, in normal use of the eye the pupil has a diameter of 7 mm or less, and objects are normally viewed in focus at not closer than 125 mm. The difference in images received by the left and right half of the retina is probably too small to be distinguished by the brain. Thus in normal vision both eyes are necessary for good depth perception.

In this invention different images can be projected onto opposite halves of the retina of a single eye. This information is registered by the brain and interpreted as a 3-dimensional picture. This effect with two eyes has been called stereopsis. Thus with one eye producing equivalent information, the effect could be called "monostereopsis".

The optical system described above allows a 3-dimensional effect to be seen with one eye only, eliminating focussing and alignment problems with two eye viewing.

The exit pupil in FIGS. 1 and 2 may be very small and need not be larger than the eye pupil, since no head or eye movement is necessary to "see" the 3-dimensional effect or depth of the object. In fact at very high magnifications (125X) the exit pupil may be smaller than the eye pupil while still allowing the 3-D effect to be seen.

The exact dividing line between the two images will not be seen by the eye in the ultimate picture viewed since the corner mirror dividing line does not occur at a focal plane where it would be in focus.

Figure 4:
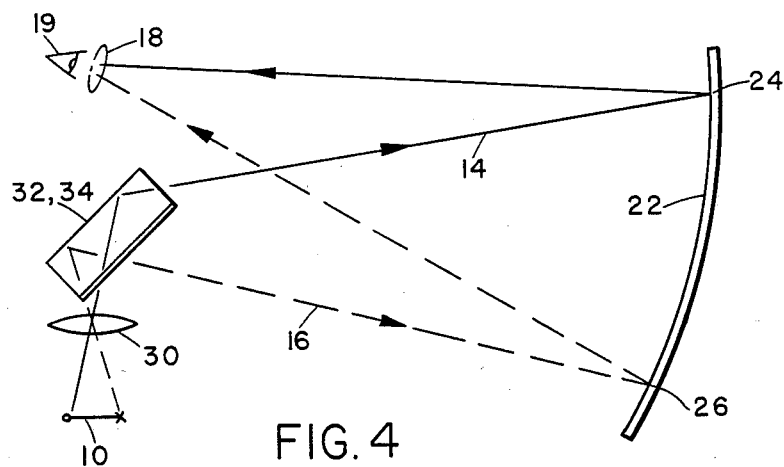
FIG. 4 is a view similar to FIG. 2 showing another modified system.

In a modification to the system shown in FIG. 4 the beamsplitter 28 is omitted and the spherical mirror 22 is mounted off-axis so as to reflect the two images directly into the exit pupil 18. This is a simpler system but has the disadvantage of putting some distortion into the picture. In FIG. 4 the system is otherwise the same as that shown in FIGS. 1 and 2 and like reference numerals have been used for like parts.

Figure 5:
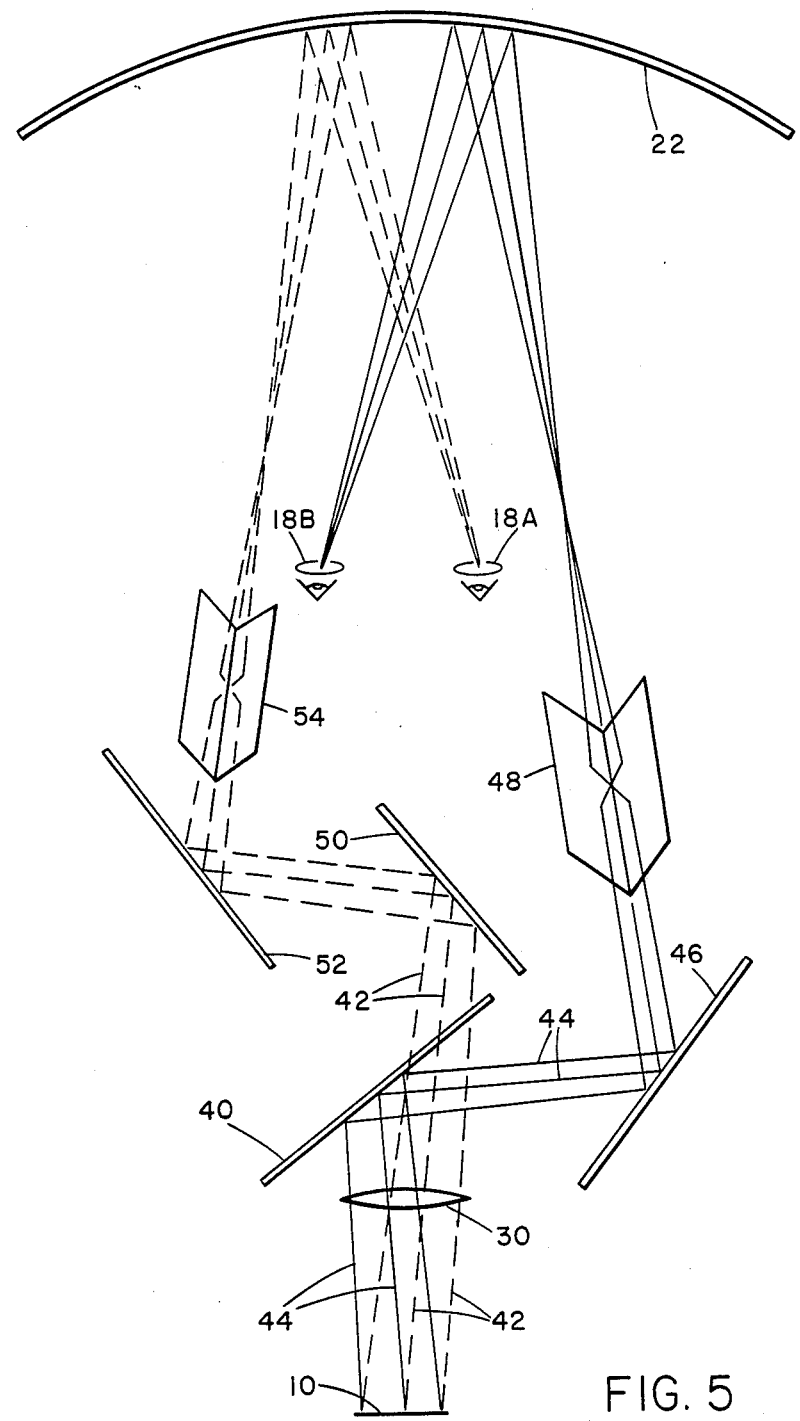
FIG. 5 is a view similar to FIG. 1 showing an alternative embodiment.

In another alternative embodiment, illustrated in FIG. 5, a pair of exit pupils 18A and 18B are used, one for each eye, instead of the single exit opening shown in the drawings. The separate images are kept separate in this embodiment and directed to the right and left eye exit pupils 18A, 18B, respectively, so that the two separate images are combined by the viewer into a 3-D picture. The embodiment of the invention in which two exit pupils are used is useful for those individuals who find it awkward to view objects using one eye only and prefer to use both eyes. In this embodiment one image is received by the retina of the left eye and the other image is received by the retina of the right eye. The two images are registered by the brain as a 3-D picture.

In FIG. 5 separate images viewed from the left and from the right of the object 10 are projected by lens 30 through a beamsplitter 40 along the separate paths 44, 42. The lefthand image 44 is reflected via an inclined mirror 46 and corner mirror 48 through a further beamsplitter onto concave spherical mirror 22, and then reflected through the exit pupil 18B into the left eye of an observer. The righthand image 42 is reflected via inclined mirrors 50, 52 and corner mirror 54 through a beamsplitter onto the spherical mirror, and then directed out via right exit pupil 18A into the right eye of the observer. The ninety-degree corner mirrors 48 and 54 are at 45° to the optical path to invert and revert the separate images.

Thus the system of inclined beamsplitter 40 and mirrors 46, 48, 50, 52 and 54 are arranged to reflect separate views of the object 10 from different sides along separate paths through the entire optical system. Mirror 50 is therefore inclined so as to effectively shutter the lefthand side of the lens 30 and only views the image projected through the righthand side of the lens 30, i.e. the view of the object 10 from the right. Similarly, the mirror 46 is inclined to the beamsplitter 40 so as to shutter the righthand side of the reflected lens image and view only the image projected through the left of the lens, i.e. a view of the object from the left.

The 3-dimensional picture viewed in the optical systems of this invention described above has little or no tendency to flatten out at high magnifications and will have no "color fringing" effects, with distinct "clean" edges on objects viewed through the system. It will be possible to "see around" objects in the field of view by moving the eye position in the exit pupil.

The optical viewing system of this invention has improved resolution, with resolutions of the order of 1 micron at 92X magnification having been achieved. It may be used, for example, for inspecting or viewing objects on which very small scale features, defects or irregularities can occur, such as solder joints on printed circuit boards, hybrid microelectronics assemblies, eye implant lenses, surface mount devices, and so on.

Although the invention has been described and illustrated above by means of specific embodiments, it will be understood that numerous changes and modifications may be made therein without departing from the scope of the invention, which is defined in the appended claims.

What is claimed is:

1. An optical system for providing a 3-dimensional view of an object, comprising:
   means for holding an object to be viewed;
   image forming and separating means for forming and projecting two different images of the same object from different angles along different optical paths through the system, the image forming and separating means comprising a projection lens and a pair of angled mirrors positioned to shutter opposite halves of the lens from each other to project separate images from opposite halves of the lens; and
   means for directing the images separately into the retina of at least one eye of an observer.

2. The system as claimed in claim 1, wherein the lens is positioned to project an image of the object and the mirrors comprise a 90 degree contiguous corner mirror positioned remote from the focal plane of the lens for splitting the image from the lens and reflecting two separate images along different optical paths through the system.

3. The system as claimed in claim 2, wherein said directing means comprises a reflector for receiving said separate images, said system including at least one eye opening for viewing the images and said reflector directing said images along separate paths into said eye opening for viewing by a single eye.

4. The system as claimed in claim 3, wherein said reflector comprises a concave mirror, located at a focal plane of said lens.

5. The system as claimed in claim 4, wherein said eye opening is located at a radius of said concave mirror.

6. The system as claimed in claim 4, wherein a beamsplitter is located in the optical path between said corner mirror and said concave mirror for transmitting said images to said concave mirror and reflecting images from said concave mirror into said eye opening.

7. The system as claimed in claim 2, wherein said lens is located above said holder and said corner mirror is located in the image path above said lens and at an inclined angle to it with the central dividing line of said mirror positioned to split the lens in half with one reflecting surface of the mirror directed at a first half of the lens and shuttering the second half of the lens, and the other reflecting surface of the mirror directed at the second half of the lens and shuttering the first half of the lens.

8. The system as claimed in claim 2, wherein said corner mirror is located between the object and the lens for reflecting two separate images of the object onto opposite halves of the lens.

9. The system as claimed in claim 1, including a right and left eye opening for viewing by the right and left eyes, respectively, of a viewer, said directing means comprising means for directing one of the images through one of the openings and the other image through the other opening.

10. The system as claimed in claim 9, wherein said directing means includes a beamsplitter positioned in the optical path after said projection lens, first reflecting means inclined to receive and reflect an image from the lefthand side of the lens only and second reflecting means inclined in the optical path to receive and reflect an image from the righthand side of the lens only.

11. The system as claimed in claim 10, wherein said directing means further includes means for directing said lefthand image into said left eye opening and means for directing said righthand image into said right eye opening.

* * * * *